(12) United States Patent
Wlotzka

(10) Patent No.: US 8,392,106 B2
(45) Date of Patent: Mar. 5, 2013

(54) PORTABLE PERSONAL NAVIGATION DEVICE

(75) Inventor: Paul Wlotzka, Nürtingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 315 days.

(21) Appl. No.: 12/112,934

(22) Filed: Apr. 30, 2008

(65) Prior Publication Data

US 2008/0270025 A1 Oct. 30, 2008

(30) Foreign Application Priority Data

Apr. 30, 2007 (EP) ..................................... 07008806

(51) Int. Cl.
*G01C 21/00* (2006.01)
(52) U.S. Cl. .................. 701/408; 701/414; 701/526
(58) Field of Classification Search .................. 342/52, 342/57, 367, 419, 444; 348/14.02, 14.03, 348/14.04, 113, 116, 729, 731; 455/3.01, 455/3.02, 3.04, 3.06, 132, 133, 136, 140, 455/142, 143, 144, 150.1, 160.1, 170.1, 171.1, 455/175.1, 176.1, 179.1, 180.1, 181.1, 185.1, 455/186.1, 186.2, 188.1, 192.1, 192.2, 200.1, 455/230, 231, 334, 335, 344, 346; 701/213, 701/200–202, 207–209
See application file for complete search history.

(56) References Cited

U.S. PATENT DOCUMENTS

| 5,206,641 | A | * | 4/1993 | Grant et al. .................... 340/905 |
| 5,406,490 | A | * | 4/1995 | Braegas ......................... 701/210 |
| 5,465,088 | A | * | 11/1995 | Braegas ......................... 340/905 |
| 6,055,478 | A | * | 4/2000 | Heron ............................ 701/213 |
| 6,072,994 | A | * | 6/2000 | Phillips et al. ................... 455/84 |
| 6,101,443 | A | * | 8/2000 | Kato et al. ...................... 701/210 |
| 6,240,364 | B1 | * | 5/2001 | Kerner et al. ................... 701/210 |
| 6,282,464 | B1 | * | 8/2001 | Obradovich ...................... 701/1 |
| 6,304,817 | B1 | * | 10/2001 | Troedel ......................... 701/200 |
| 6,373,430 | B1 | * | 4/2002 | Beason et al. ............. 342/357.34 |
| 6,434,138 | B2 | * | 8/2002 | Kersken et al. ................. 370/349 |
| 6,725,022 | B1 | * | 4/2004 | Clayton et al. .............. 455/154.1 |
| 6,868,264 | B2 | | 3/2005 | Dietz et al. |
| 7,171,174 | B2 | * | 1/2007 | Ellis et al. ...................... 455/132 |
| 7,177,608 | B2 | * | 2/2007 | Herz et al. ................... 455/185.1 |
| 7,343,141 | B2 | * | 3/2008 | Ellis et al. ...................... 455/132 |

(Continued)

FOREIGN PATENT DOCUMENTS

| DE | 196 40 735 A1 | 10/1996 |
| EP | 1 298 418 A1 | 4/2003 |

(Continued)

OTHER PUBLICATIONS

GXM 30 XM Smart Antenna for Automotive—Owner's Manual, Oct. 2005, Garmin Ltd., Revision A, http://www.garmin.com/manuals/StreetPilot7500_GXM30forAutoProductsOwnersManual.pdf.*

(Continued)

*Primary Examiner* — Gertrude Arthur Jeanglaude
(74) *Attorney, Agent, or Firm* — Brooks Kushman P.C.

(57) ABSTRACT

A portable personal navigation device having at least one receiver for receiving radio waves and an output unit for outputting audio signals, where the receiver is configured to receive radio programs and where the output unit is configured to play back the radio programs.

21 Claims, 4 Drawing Sheets

U.S. PATENT DOCUMENTS

| | | | |
|---|---|---|---|
| 7,502,686 B1 * | 3/2009 | Pemble et al. | 701/213 |
| 2003/0013425 A1 * | 1/2003 | Nee | 455/186.1 |
| 2004/0248538 A1 * | 12/2004 | Kottschlag et al. | 455/272 |
| 2005/0096040 A1 * | 5/2005 | Haberman et al. | 455/422.1 |
| 2005/0215194 A1 * | 9/2005 | Boling et al. | 455/3.02 |

FOREIGN PATENT DOCUMENTS

| | | |
|---|---|---|
| EP | 1475909 A1 * | 11/2004 |
| GB | 2 411 552 A | 8/2005 |
| WO | WO02067447 A2 * | 8/2002 |

OTHER PUBLICATIONS

StreetPilot(RT) 2730—Detailed Specifications, 2005, Garmin Ltd., https://buy.garmin.com/shop/store/assets/pdfs/specs/sp2730_spec.pdf.*

StreetPilot(RT) 7200 and 7500—Detailed Specifications, 2005, Garmin Ltd., https://buy.garmin.com/shop/store/assets/pdfs/specs/sp7000series_spec.pdf.*

Jurgen, Broadcasting with Digital Audio, Mar. 1996, IEEE Spectrum, vol. 33 Issue 3, pp. 52-59.*

Gilroy, Real-Time Traffic Goes Portable, Aug. 22, 2005, TWICE, retrieved from HighBeam Research http://www.highbeam.com/doc/1P1-115029853.html.*

Tuttlebee et al., Consumer Digital Radio: From Concept to Reality, Dec. 1998, IEEE Electronics & Communication Engineering Journal, vol. 10 Issue 6, pp. 263-276.*

XM Satellite Radio Upgrade for New Garmin StreetPilot(TM) Series, Oct. 31, 2005, PR Newswire, retrieved from HighBeam Research http://www.highbeam.com/doc/1G1-138818379.html.*

* cited by examiner

PORTABLE PERSONAL NAVIGATION DEVICE

RELATED APPLICATIONS

This application claims priority of European Patent Application Serial Number 07 008 806.7, filed on Apr. 30, 2007, titled PORTABLE PERSONAL NAVIGATION DEVICE, which application is incorporated in its entirety by reference in this application.

BACKGROUND OF THE INVENTION

1. Field of the Invention

The present invention relates to a portable personal navigation device and a method of operating such a device.

2. Related Art

Portable personal navigation devices are recently being used by a great number of people for navigating in populated and remote areas. For navigating in populated areas, these devices are usually stored or fixed inside a vehicle, whereas for navigating in remote areas, such as when hiking, these devices are carried on the body or in a backpack. In both situations, people often like to be informed or entertained by radio programs. Means for receiving radio programs are generally provided inside a vehicle, yet when hiking, additional devices for receiving radio programs have to be carried along. The reception of radio programs is of particular importance when hiking, for example to inform the hiker of the current weather situation. On the other hand, the hiker has only a limited amount of space available for carrying equipment, and needs to reduce the carried weight as much as possible. Thus, it is a disadvantage for the hiker to have to carry two devices, one for navigation and one for receiving radio programs.

Modern navigation systems for vehicles are often shaped in the form of a car stereo, where the system comprises the functionality of both a car stereo and a navigation device. Such a system may for example be equipped with a navigation unit for processing data relating to navigation, and for displaying navigation information to the driver, and with a tuner for receiving traffic information from a traffic message channel (TMC) and for playing back radio programs. The traffic message channel is generally transmitted as part of an RDS signal in the FM frequency range. The information submitted through the TMC is used by the navigation system to reroute a given route in case a traffic jam is reported on the given route. These systems have proved to be very useful, yet they are only available for fixed installation inside a vehicle. These systems have the disadvantage that they cannot be used for navigation and radio playback outside the vehicle.

Furthermore, handheld navigation devices are known in the art, such as pure navigation devices having a GPS receiver, or multifunctional devices, such as handheld personal computers, which may be extended by additional hardware and software to enable navigation. The multifunctional devices may furthermore include components for outputting audio signals, such as loudspeakers. Most recently, GPS receivers are being directly integrated into personal digital assistant (PDA) devices. Thus, the portable PDA device is provided with navigational functionality. These devices are generally not able to receive radio programs. This is a disadvantage because an additional device is needed to receive a radio program.

Therefore, a need exists to provide a device that is portable, has navigational functionality and is able to receive radio programs.

SUMMARY

A portable personal navigation device having radio functionality is provided. According to one example of an implementation, the portable personal navigation device includes at least one receiver for receiving radio waves and an audio signal output unit. The receiver is configured to receive radio programs and the audio signal output unit is configured to play the radio programs. The audio signal output unit may include internal speakers, headphones that may be connected to the portable personal navigation device, or simply a connector through which sound signals are output to another electronic device. The radio receiver may be controlled by analog or digital control elements, such as analog potentiometers or incremental encoders. The radio receiver may also be controlled by a microprocessor, where the input takes place utilizing other mechanisms, such as a touchscreen or a remote control. The audio signal output unit may also be utilized to output sound from other audio sources, such as the playback of MP3 sound files or the output of audible navigation instructions by the portable personal navigation device. In this manner, the portable personal navigation device may combine both the functionality of a personal navigation device with the functionality of a radio, while still being portable.

According to another implementation, the receiver of the portable personal navigation device may be further configured not only to receive a traffic message channel, but also to receive radio programs. That way, radio programs and a traffic message channel can both be received by one receiver. In this example, only one receiver has to be provided and can be switched between receiving the radio program or receiving a traffic message channel. For example, an existing receiver for the traffic message channel can be reconfigured so that it is possible to receive radio programs with the receiver. If only one receiver is provided, the production cost as well as the weight of the personal navigation device can be reduced.

While the portable personal navigation device may include only one receiver, it may also utilize two or three receivers, for example, for receiving different radio bands or for simultaneously receiving two radio channels, such as a radio program and a traffic message channel. In this regard, according to another implementation, the portable personal navigation device may include two radio wave receivers, where one receiver is configured to receive radio programs and the other receiver is configured to receive a traffic message channel. That way, the traffic message channel can still be received and the navigation route can still be automatically updated according to the received traffic information, while at the same time, the user can listen to radio programs.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon

DETAILED DESCRIPTION

Figure 1:
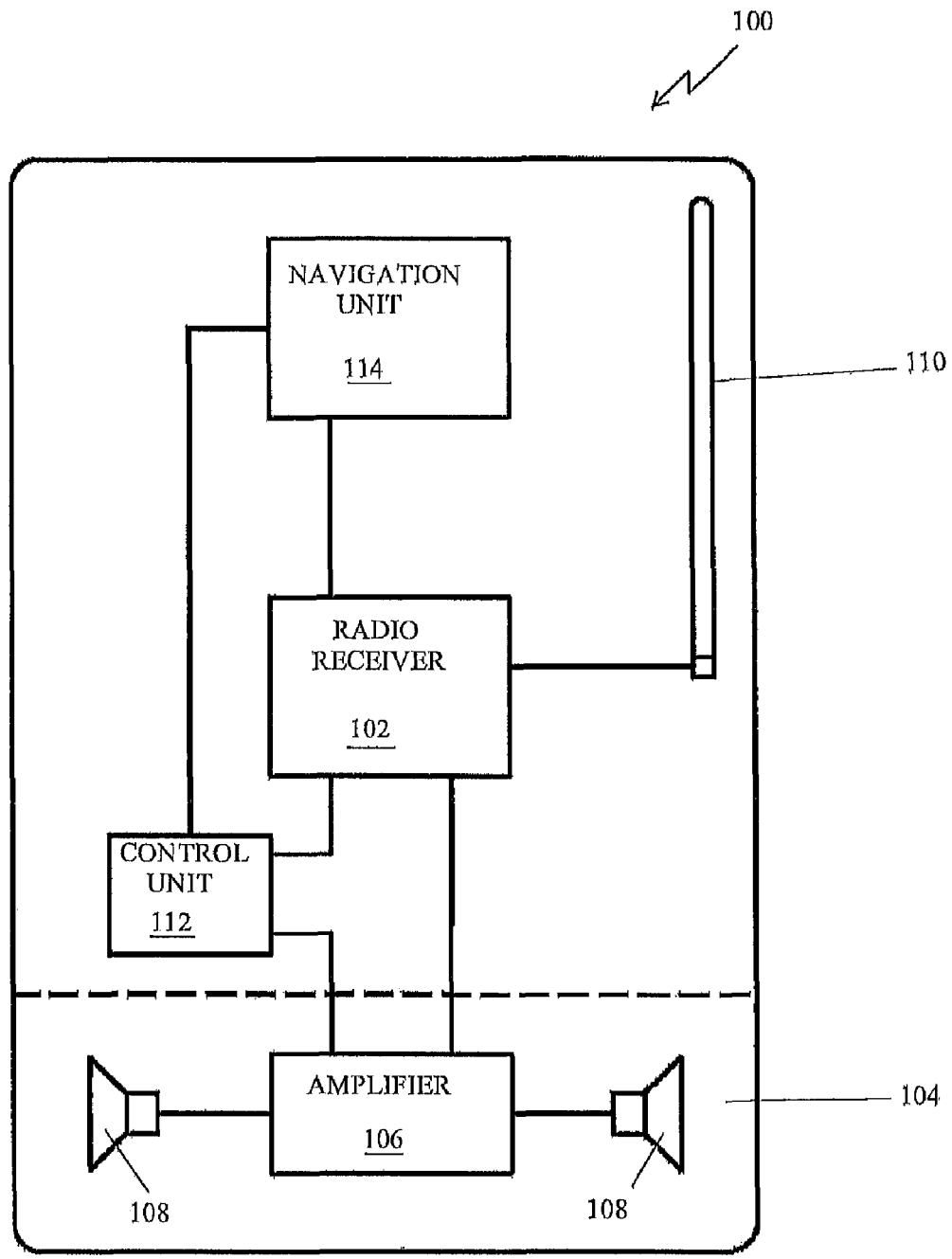
FIG. 1 is a schematic drawing of one example of one implementation of a portable personal navigation device having a radio receiver and an audio signal output mechanism.

FIG. 1 is a schematic drawing of one example of one implementation of a portable personal navigation device 100 having a radio receiver 102 and an audio signal output unit or component 104. The radio receiver 102 is configured for receiving multiple radio bands as well as traffic message channels. Radio signals received by the receiver 102 are demodulated and transmitted to audio signal output unit 104 which includes an amplifier 106 and loudspeakers 108. The amplifier 106 amplifies the sound signal received from the radio receiver 102, the sound signal being converted to sound by the loudspeakers 108. Even though one loudspeaker 108 may be sufficient to give out sound, providing two loudspeakers 180 provides stereo sound. Radio waves are received by the radio receiver 102 from the antenna 110.

The antenna 110 is only shown schematically in FIG. 1; it may have any shape suitable for receiving radio waves. Although FIG. 1 illustrates the use of an internal antenna 110, the antenna 110 may be mounted inside the device or may be mounted to the outside of the device. The same applies for the antenna 206 of FIG. 2. When mounted inside the device, the antenna 110 may be formed in the shape of track on a printed circuit board. It may also be formed as a spiral on linear antenna inside the housing of the portable personal navigation device 100. The antenna 110 may be formed as an extendable antenna that can be extended beyond the perimeters of the housing of the portable personal navigation device 100. Such an extendable antenna 110 may be mounted inside the housing of the portable personal navigation device 100 so that it hardly protrudes from the housing when retracted, or it may be mounted on the outside of the housing of the portable personal navigation device 100. An antenna 110 generally provides good reception when its length is a multiple or a fraction of the wavelength of the radio waves that are to be received. Thus, an extendable antenna 110 may receive longer wavelength radio bands. Generally, a great variety of antennas are known in the art. It should be understood that it does not matter which type of antenna 110 is used in the portable personal navigation device 100 as long as the antenna 110 is adapted to receive the appropriate radio band. One or more radio bands may be received by one antenna 110. Alternatively, multiple antennas 110 may be provided for a better reception of multiple radio bands.

For example, one antenna 110 may be provided to receive the VHF band, whereas another antenna 110 may be provided to receive the medium wave band. Furthermore, an antenna 110 may be provided for receiving the radio waves where the antenna is connected to the portable personal navigation device 100 by a connector, such as connector 207, shown in FIG. 2. This has the advantage that the portable personal navigation device 100 can receive radio programs through an external antenna, where the external antenna may be optimized for several radio bands. Such an external antenna can for example be the antenna of a car, or the antenna of a house. Yet it may also be a mobile cable antenna, for example such a type of antenna that is currently provided with TMC receivers. Such an external antenna may yield better reception than the antenna 110 mounted to the personal navigation device 100.

The portable personal navigation device 100 furthermore includes a control unit 112. The control unit 112 controls functions of the radio receiver 102, such as the tuning and the radio band received, and it also controls audio signal output unit 104, for example, the amount of amplification provided by the amplifier 106. The control unit 112 may be controlled by the user by control elements (not shown), which may include analog control elements, such as potentiometers in the form of turning knobs or sliders, or digital control elements, such as push buttons or incremental encoders or a touchscreen. The portable personal navigation device 100 furthermore comprises a navigational unit 114. The navigational unit 114 includes all elements necessary to enable navigation, such as a GPS antenna and receiver, and mechanisms and software for processing the GPS signals, as well as mechanisms for user communication, such as a display and input mechanisms. When the navigation device 100 is in the navigational mode, it receives a traffic message channel using the receiver 102, where the information provided by the traffic message channel is sent to the navigational unit 114. The navigational unit 114 can then calculate routes taking into account the information provided. The tuning of the receiver 102 to the traffic message channel may occur by the navigational unit 114 sending control signals to the control unit 112. With such an arrangement, the personal navigation device 100 can be utilized for navigation with TMC functionality and radio program reception, while only utilizing one radio receiver 102. Alternatively, a radio menu may be provided on the display of navigational unit 114. The selection of a function from the radio menu is then communicated to the control unit 112 that controls the receiver 102 or the audio signal output unit 104 accordingly.

According to one example of an implementation, the radio receiver 102 may be an existing traffic message channel receiver of the portable personal navigation device 100 and the audio signal output unit 104 may be the existing output unit 108 of the portable personal navigation device. In this regard, the radio receiver 102 originally configured to receive traffic message channels is reconfigured to receive radio broadcast and the output unit 108 is then reconfigured to play the radio broadcast. When this type of reconfiguration is performed, no new hardware has to be provided. The existing hardware of the personal navigation device 100 is simply reconfigured in, such a way that radio programs can be received and played back. Navigation devices 100 in the form of personal digital assistants (PDAs) often already include output units 108, such as loudspeakers, and recently, these devices have been provided with traffic message channel receivers. Thus, only small changes to the hardware and the software of a PDA may be required to enable reception of radio programs. Accordingly, a very cost effective method of enabling radio reception is provided. Reconfiguration in that context can mean a small reconfiguration of the hardware, such as the frequency range that the existing receiver is able to receive or the hardware required for demodulating the radio signals, or the implementation of analog-to-digital conversion of the demodulated signal so that the digital radio signal may be processed and output by the personal navigation device 100. Furthermore, the software will have to be reconfigured to implement the new functionality, and to provide a control menu for controlling the receiver and the audio output.

As will be explained in more detail in connection with FIG. 2, more expensive versions of the portable personal navigation device 100 may be designed to include two or more receivers so that the receivers can be better adapted to their individual function and so that radio programs and the traffic message channel can both be received simultaneously.

Figure 2:
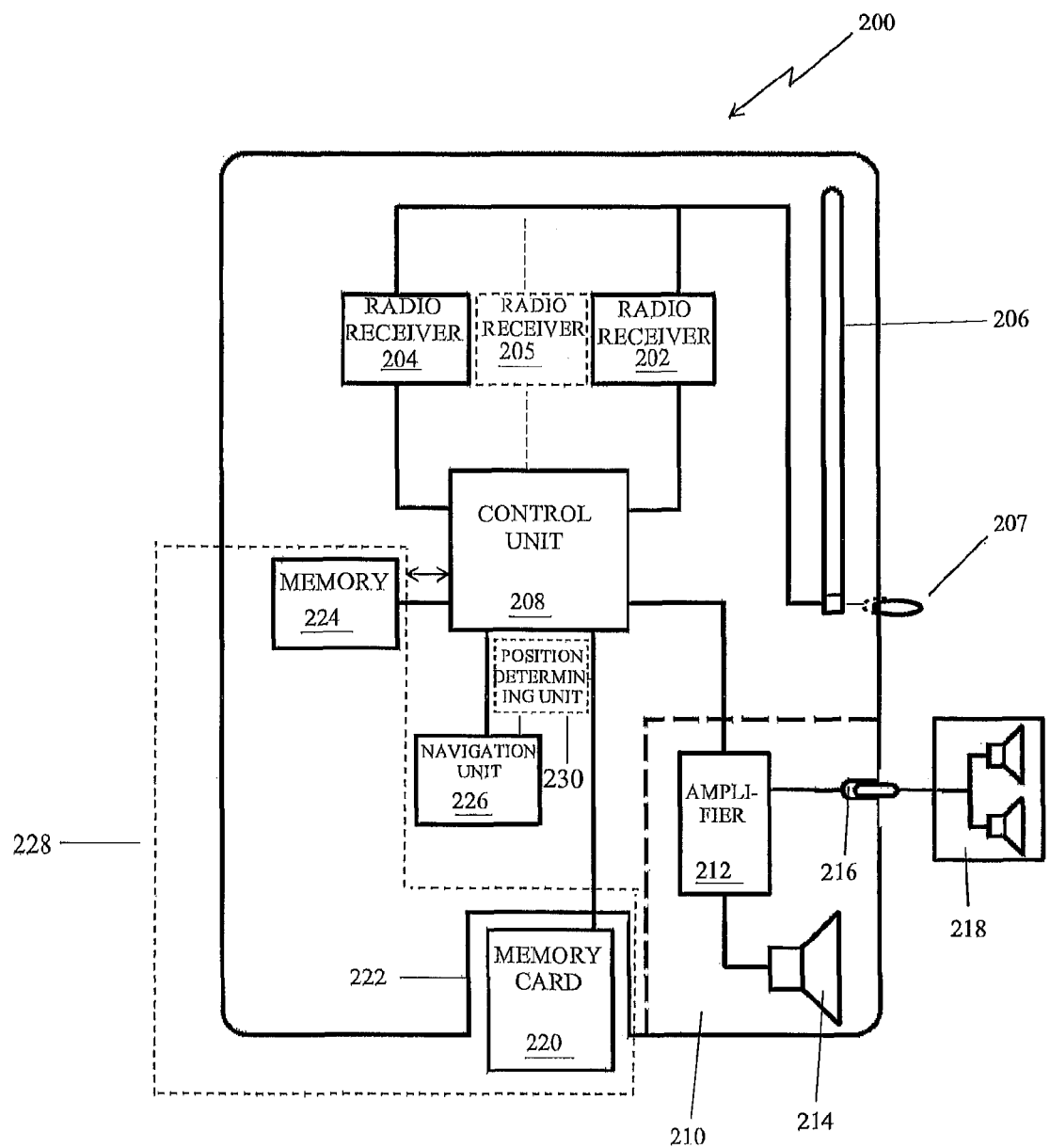
FIG. 2 is a schematic drawing of another example of an implementation of a portable personal navigation device having two receivers and a slot for inserting a memory card.

FIG. 2 is a schematic drawing of another example of an implementation of a portable personal navigation device 200 having two receivers and a slot for inserting a memory card. In the example of FIG. 2, two radio receivers 202 and 204 are provided. In the illustrated example, both receivers 202 and 204 are connected to an antenna 206, although each receiver 202, 204 may also be connected to separate antennas 206. One receiver 202 is optimized to receive traffic message channels, whereas the other receiver 204 is optimized to receive radio programs, which may be received on different radio bands. The demodulated radio signals undergo an analog-to-digital conversion (not shown) and are transmitted to the control unit 208. Control unit 208 may include components generally provided to operate a personal digital assistant or a personal navigation device 100, such as a microprocessor and the required software. For the playback of radio programs, the radio signal transmitted from the receiver 204 to the control unit 208 may be processed by the control unit 208, for example by changing the tone of the radio signal, and is subsequently transmitted to the audio signal output unit 210. Before transmission, the digital radio signal may undergo digital-to-analog conversion (not shown). The audio signal output unit 210 includes an amplifier 212, a loudspeaker 214 and a connector 216. The audio signal output unit 210 may be configured in such a way that when another device is connected via the connector 216, output of sound by the loudspeaker 214 is suppressed.

While more than one loudspeaker 214 may be provided, to save weight and production costs, one loudspeaker 214 may only be provided. Headphones 218 may be connected to the connector 216. Alternatively, a home stereo system or a car stereo system may be connected to the connector 216 by a cable (not shown). With such an arrangement, high quality sound output can be achieved. In the illustrated example, the audio signal output unit 218 may not only used to play back radio programs received by receiver 204, but also to play back sound from other audio sources, such as from MP3 sound files processed by the control unit 208, or such as navigational instructions.

As described, different means are available by which sound can be output by the portable personal navigation device 200. In addition to utilizing integrated speakers 214, a connector 216 may provide audio signals in the form of time varying voltages. For example, headphones 218 may be connected to that connector 216, or another audio device, such as a home stereo system or a car stereo system or a portable stereo system or external speakers, such as known from computer systems, which may be active or passive. Using integrated loudspeakers eliminates the need for another output device. Due to the limited space in the portable personal navigation device, integrated loudspeakers are generally small in size and thus have a very limited dynamic range. Connecting the portable personal navigation device 100 to another audio output device by means of the connector 216 may thus provide a better sound quality. Headphones 218 may be used in situations where the surrounding noise level is high and other persons may be distracted by the sound output. Both integrated loudspeakers 214 and a connector 216 may be provided for outputting the audio signals.

Furthermore, a memory card 220 may be provided and arranged in a slot 222. The memory card 220 is not integrally connected to the portable personal navigation device 100, it can be easily removed from the slot 222 by hand. That way, radio programs received by receiver 204 and processed by control unit 208 can be stored on the memory card 220. Since the memory card 220 is exchangeable, it can be exchanged when its memory is exhausted and a new empty memory card be inserted into slot 222. That way, radio programs can be stored and archived, or formerly recorded radio programs may be played back at a later time, and a memory card with a stored recording may be inserted into the slot of the personal navigation device for playback of the recording at a later time. Furthermore, memory cards with recordings may be exchanged between different users. Control unit 208 may be programmed to receive the radio programs periodically, or at predetermined times. That way, a user can determine when a radio program is recorded, and he does not have to immediately listen to the radio program, but can access it a later time. Different types of memory cards 220 are known in the art, and it is not important for the scope of the invention which type of memory card 220 is utilized. Examples of such memory cards are compact flash cards, micro drives, memory sticks, SD cards, USB sticks, and the like. Before recording a radio program, it may be temporarily stored in an internal memory 224, such as a random access memory (RAM), or may be more permanently stored in an internal memory, such as an internal flash memory or an internal hard drive. That way, the radio program may be modified, for example, certain pieces may be cut out, before it is stored on the memory card 220. The radio programs may also only be stored on the internal memory 224.

Furthermore, a navigation unit 226 is provided that may include, for example, a GPS receiver and a GPS antenna. The navigation unit 226 provides the control unit 208 with navigational information. The control unit 208 can process that information together with information from the traffic message channel receiver 202 to calculate a route. Since two receivers 202 and 204 are provided, receiving the traffic message channel can occur simultaneously with playing back radio programs. That way, receiving the radio program does not need to interrupt calculating a route or updating a route with new traffic information. The control unit 208 furthermore includes control elements and a display (not shown). The display itself may be a control element; for example, it may be a touchscreen. By using either one of the control elements or the touchscreen, the user can bring up a radio menu on the display. Such a radio menu may include functions for controlling the radio program receiver 204. Such functions may also include changing the radio band or changing the frequency received, but may also include such functions as activating a noise suppression or enabling the reception of radio programs in stereo. The display is used to display, among other things, information relating to the navigation, or to display information relating to the radio program currently received, or to display control elements by which the portable personal navigation device 200 can be controlled. For example, when using the personal navigation device for navigation while receiving a radio program, a status bar may be displayed together with information relating to navigation, said status bar displaying information relating to the radio reception, such as the frequency currently received or RDS information. Such a status bar may also include control elements that can be used to change the radio program currently received which may be activated, e.g., via a touchscreen, a cursor or a control element.

As mentioned above, the receiver for radio programs 204 may receive radio programs broadcast in different radio bands, where the different radio bands may have different modulations, for example, very high frequency (VHF), shortwave (HF), medium wave, and longwave. The radio bands may have slightly different frequency ranges in different countries. Therefore, the receiver 204 may be able to receive the full band in one country, whereas it is only able to receive a part of a band in another country. The receiver 204 may be configured so that it can be tuned to the full band in most countries. Alternatively, the receiver 204 may be configured so that it can be tuned to only one band or, may be configured so that it can be tuned to two, three, four or even more radio bands. Configuring the receiver 204 for receiving multiple radio bands allows radio programs from different sources to be received. For example, when using the longwave radio band, radio programs from very far away sources may be received. The use of the VHF band provides high quality sound transmission. Depending on the regulations for receiving radio waves, which may differ from country to country, certain radio frequencies may have to be restricted. In general, the range of radio bands that the receiver 204 is able to tune to will depend on the specific application, for which the portable personal navigation device is configured. To a person skilled in the art, it should be clear that different modulations are used for the different radio bands, such, as frequency modulation (FM), amplitude modulation (AM) or signal, side band (SSB), and that the receiver 204 formed to receive a certain band is also formed so as to demodulate said band. The receiver 204 may also be configured to receive radio programs broadcast digitally. The digital audio broadcasting technique enables the reception of radio programs with improved sound quality and decreased background noise and interferences. The audio data received digitally by the receiver 204 may be compressed, e.g. by using the MUSICAM system or Advanced Audio Coding-Codecs. Accordingly, the receiver 204 may be formed so as to receive and decompress digital radio programs or digital audio broadcasts. The digital radio programs may be broadcast using carrier frequencies that are different from the carrier frequencies of the analog radio broadcasts. Accordingly, the receiver 204 may be formed so as to receive these frequencies such as the VHF band III ranging from 174-230 MHz or other bands transmitting digital radio programs. For this purpose, the personal navigation device 200 may be provided with three receivers 202, 204, 205, one for receiving a traffic message channel 202, one for receiving analog radio programs 204 and one for receiving digital radio programs 205.

When recording radio programs on the memory card 220, the radio program may be digitally recorded either uncompressed or compressed, where different compression standards may be used to compress the sound signal. The compression may be either lossless or associated with loss, where the quality of a recording with a compression associated with loss is generally denoted by how many bits per second are recorded. Lower bit rates are associated with a higher compression and a lower sound quality. The compression of a recording and the amount of memory available on the memory card 220 determine the duration for which radio programs may be recorded. The compression rate may be set to a fixed value by the user, e.g., to high sound quality corresponding to low compression, where the time available for recording the radio program to the memory card 220 may be estimated or calculated by the personal navigation device. Alternatively, the user may set a duration for which he wants to record the radio program, and the personal navigation device calculates a compression rate required to fit the recording on the memory card 220 inserted.

The portable personal navigation device 200 may also include a recording unit 228 for recording radio programs. The recording unit may be analog means, such as a magnetic tape, yet, the radio programs may also be recorded digitally. For this purpose, the sound signal demodulated by the radio receiver may be converted to digital sound data by an analog-to-digital converter. The digital sound data may at first be recorded in a temporary memory, such as the personal navigation devices' RAM, and may later be stored on an internal hard drive or internal flash memory, or an external memory, such as a compact flash card or a micro drive or a USB stick or any other kind of mobile memory that can be connected to the personal navigation device 200. The radio program may be recorded live, meaning that the radio program is recorded as it is played back, or the radio program may be recorded at predetermined times, where these times may be programmed by a user of the personal navigation device 200. The user may, for example set the timer so that a weather broadcast is periodically recorded, whereby the user has always access to the latest weather broadcast. This may be very useful when hiking, particular in areas where weather changes are common. A user may also record his favorite radio program, for listing to the radio program at a later time suitable for the user. The way in which the radio recording is stored is thereby not of importance, it is just important that the radio program can be recorded by the user.

The example in FIG. 2 combines a fully functional personal navigation device and a multi-band radio receiver. Such a device is particularly useful for travelers and for hikers, who require both a device for navigating in unknown areas as well as a multi-band radio receiver for receiving radio programs over large distances. The possibility to record radio programs increases the functionality and may be particularly useful in situations where the user of the device may not be able to listen to the radio program live, but still depends on the information provided in the radio program.

It should be clear that the personal navigation device may include the full functionality of a modern personal navigation device, for example navigational functionality and multimedia functionality, such as the playback of MP3 files, recorded radio programs or of movie files or the display of images stored on the personal navigation device.

As further illustrated in FIG. 2, the portable personal navigation device may further include a position determination unit 230 for determining a position of the personal navigation device 200. At least one receiver 202 of the portable personal navigation device 200 may then be configured so as to tune to a radio channel in accordance with position information supplied by the position determination unit 230. The portable personal navigation device 200 may for example include a memory 224 for storing radio channel frequency information in association with position information. The portable personal navigation device 200 may thus be provided with information on which frequencies a radio channel may be received in a particular geographical area.

Figure 3:
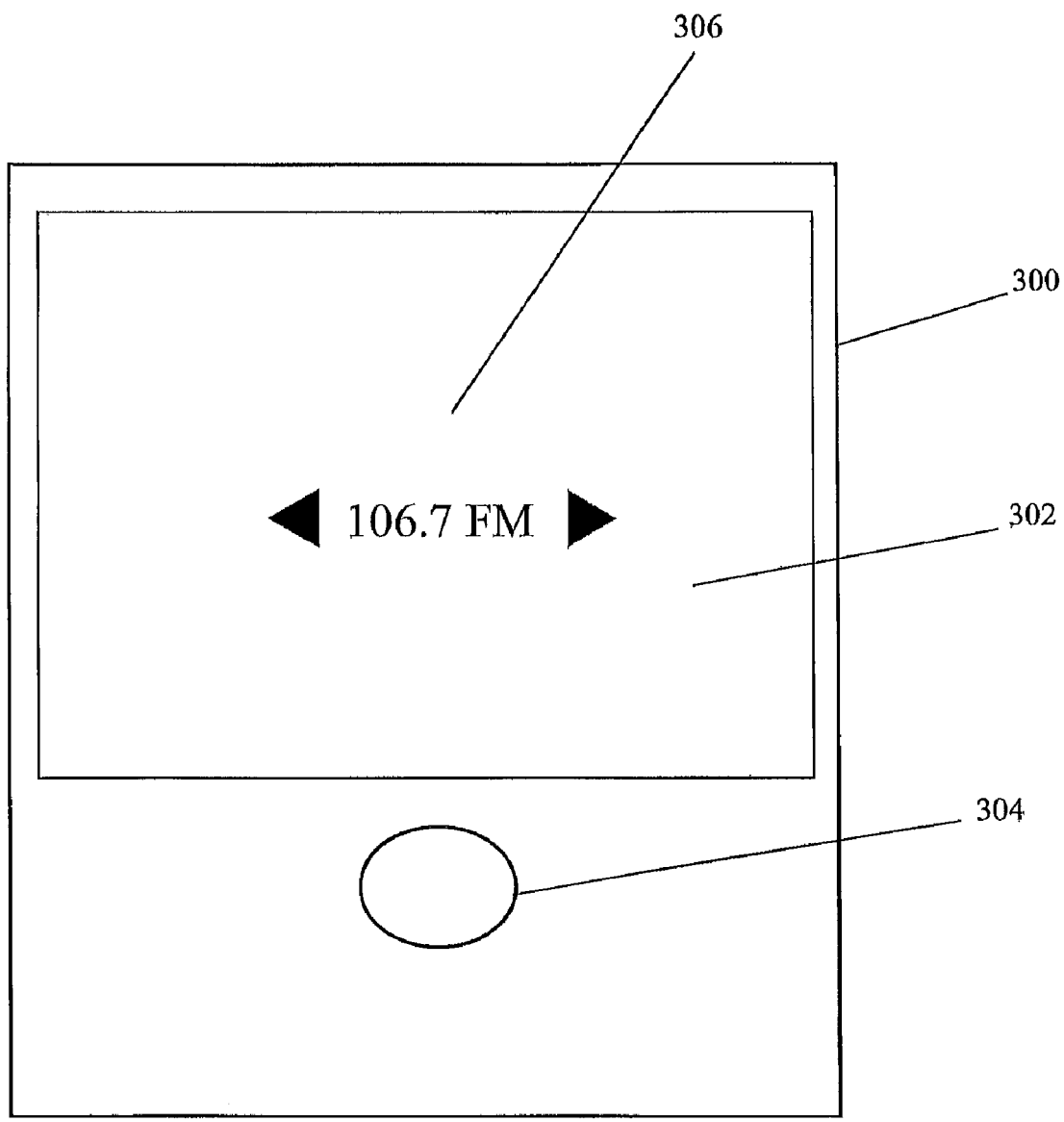
FIG. 3 is an illustration of one example of a portable personal navigation device having a display and a control element for displaying and controlling a radio menu.

FIG. 3 is an illustration of one example of a portable personal navigation device 300 having a display 302 and a control element 304 for displaying and controlling a radio menu 306. In the illustrated example, the portable personal navigation device 300 includes a display 302 having a radio menu 306 displayed on the display by actuation of control element(s) 304 disposed on the portable personal navigation device 300. The radio menu 306 may include at least functions for controlling the radio receiver. The radio menu 306 may further include other functions, for example, for controlling the audio output. The radio menu 306 may also include functions for changing the frequency that is received by the receiver, or for changing the radio band, i.e., the frequency range that is currently received, and other functions related radio reception, e.g., noise suppression and the like. The portable personal navigation device 300 may be provided with functionality similar to that of a multi-band radio. Accordingly, the radio menu 306 may include functions that are usually provided on a multi-band radio. Buttons re-sampling those on a multi-band radio may for example be provided on a touch screen, where they can be actuated by pressing them with a finger or a pen. Alternatively, control elements may be provided on the personal navigation device 300 that directly controls the radio receiver. Using a radio menu 306 displayed on a display 302 to control the radio receiver allows the functions in the menu to be changed according to the requirements or application, whereas using control elements that directly control the receiver allows some applications currently running on the personal navigation device, such as a navigational application, to not be interrupted to change the radio settings. In general, only limited space is available on a personal navigation device 300 for control elements 304. Therefore, it may be desirable to provide control of the radio receiver by a radio menu 306.

Providing functionality similar to that of a multi-band radio may also be desirable for world travelers, which may use the device to navigate in a foreign country, while still wanting to receive radio broadcast from their county of origin. Particularly, shortwave radio waves may be received over very long distances. To enable the reception of multiple radio bands may therefore make the portable personal navigation device 300 very versatile and especially useful for world travelers.

Figure 4:
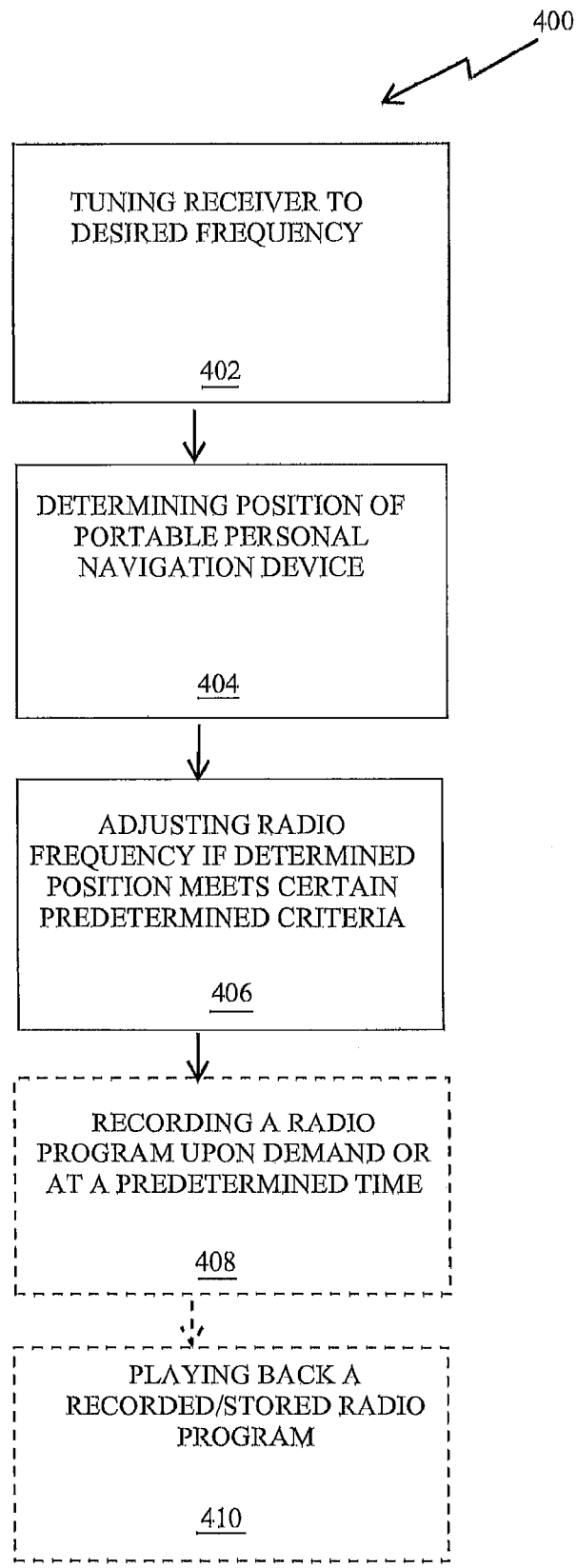
FIG. 4 is flow diagram of one example of a method of operating a portable personal navigation device having a radio receiver.

FIG. 4 is flow diagram of one example of a method 400 of operating a portable personal navigation device 100, 200, 300 having a radio receiver. According to one implementation, the method includes the step 402 of tuning the receiver of the portable personal navigation device 100, 200, 300 to a frequency for receiving a radio program. Further, at step 404, a position is determined using a position determination unit 230 (FIG. 2) of the portable personal navigation device 100, 200, 300. At step 406, the frequency for receiving a radio program is adjusted if the determined position meets a predetermined criterion.

In one example of an implementation, the predetermined criterion may be whether the determined position is located within a predetermined geographical area. When leaving the area in which a particular radio channel can be received on a particular frequency, the personal navigation device 100, 200, 300 may, for example, tune to another frequency, on which another channel is received, or may tune to another frequency, on which the same channel can be received.

According to another implementation, a method of operating a portable personal navigation device 100, 200, 300 may further include, at step 408, recording a received radio program either upon command or at predetermined times using a recording unit. At step 410, the method then allows for the recorded or stored radio program in the memory of the portable personal navigation device to be played back.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIGS. 1 & 3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustrations and description. It is not exhaustive and does not limit the claimed inventions to the precise form disclosed. Modifications and variations are possible in light of the above description or may be acquired from practicing the invention. The claims and their equivalents define the scope of the invention.

The invention claimed is:

1. A portable personal navigation device comprising:
 a navigation unit configured to determine a location of the portable personal navigation device, calculate a route to a predetermined destination, and display navigational information to a user;
 a receiver configured to receive multiple radio band, where the multiple radio bands include:
  a traffic message channel that provides information to the navigation unit for calculating the route;
  radio bands for analog radio programs; and
  radio bands for digital radio programs;
 a control unit configured to select and tune between the traffic message channel and the radio bands; and
 an audio signal output unit configured to play back the radio programs.

2. The portable personal navigation device of claim 1, wherein the receiver can be tuned to at least a portion of one or a plurality of the following radio bands: very high frequency (VHF), shortwave (HF), medium wave, and longwave.

3. The portable personal navigation device of claim 1, further comprising a recording unit for recording radio programs.

4. The portable personal navigation device of claim 3, further including a slot for receiving a memory card and wherein the recording unit is a memory card arranged in the slot.

5. The portable personal navigation device of claim 1, wherein the audio signal output unit includes at least one loudspeaker that is integrated in the portable personal navigation device.

6. The portable personal navigation device of claim 1, wherein the audio signal output unit includes a connector for providing audio signals in the form of time varying voltages.

7. The portable personal navigation device of claim 1, wherein an antenna is provided for receiving radio waves at the receiver, the antenna being mounted to the portable personal navigation device.

8. The portable personal navigation device of claim 1, further including an antenna connector and wherein an antenna is connected to the portable personal navigation device by the antenna connector.

9. The portable personal navigation device of claim 1, further including
 a display; and
 at least one control element of the control unit, where by actuating the at least one control element a radio menu is displayed on the display, the radio menu having at least functions for controlling the radio wave receiver for selecting and tuning the radio bands.

10. The portable personal navigation device of claim 1, wherein the portable personal navigation device is provided with functionality of a multi-band radio.

11. A portable personal navigation device comprising:
 a navigation unit configured to determine a location of the portable personal navigation device, calculate a route to a predetermined destination, and display navigational information to a user;
 a first receiver configured to receive analog and digital radio programs;
 a second receiver configured to receive a traffic message channel that provides information to the navigation unit for calculating the route;
 a control unit configured to select and tune between the traffic message channel and the analog and digital radio programs;
 a recording unit capable of recording a radio program at predetermined times; and
 an audio signal output unit configured so as to play back recorded radio programs at tires determined by the user.

12. The portable personal navigation device of claim 11, further comprising:
 a position determination unit determining a position of the portable personal navigation device;
 wherein the first radio receiver is configured so as to tune to a radio channel in accordance with position information supplied by the position determination unit.

13. The portable personal navigation device of claim 12, further comprising a memory for storing radio channel frequency information in association with position information.

14. A portable personal navigation device comprising:
 a navigation unit configured to determine a location of the portable personal navigation device, calculate a route to a predetermined destination, and display navigational information to a user;
 a multiple band receiver for radio waves configured to receive analog and digital radio programs;
 a control unit configured to select and tune between the analog and the digital radio programs;
 a second receiver configured so as to receive a traffic message channel while simultaneously receiving the analog and the digital radio programs; and
 an output unit for outputting an audio signal configured to play back the radio programs.

15. The portable personal navigation device of claim 14, further comprising a recording unit capable of recording a radio program at predetermined times.

16. A method of operating a portable personal navigation device, the method comprising the steps of
 tuning a multiple band receiver of the portable personal navigation device to a frequency for receiving a radio program;
 determining a position with a position determination unit of the portable personal navigation device;
 adjusting the frequency for receiving a radio program if the determined position meets a predetermined criterion;
 calculating a route to a predetermined destination;
 tuning the multiple band receiver to a traffic message channel;
 receiving traffic information the traffic message channel that provides information to the position determination unit for calculating the route; and
 recalculating the route using the traffic information.

17. The method of claim 16, wherein the predetermined criterion is whether the determined position is located within a predetermined geographical area.

18. A method of operating a portable personal navigation device, the method comprising the steps of
 determining a position with a position determination unit of the portable personal navigation device;
 calculating a route to a predetermined destination;
 receiving traffic information from a multiple band receiver configured to receive a traffic message channel that provides information to the position determination unit for calculating the route;
 recalculating the route using the traffic information;
 at predetermined times, tuning the multiple band receiver to an analog radio program and recording the analog radio program using a recording unit; and
 at predetermined times, tuning the multiple band receiver to a digital radio program and recording the digital radio program using the recording unit.

19. The method of claim 18, wherein the position is continuously being determined by the portable personal navigation device while the radio program is being recorded.

20. The method of claim 18, further comprising the step of providing navigation information to a user of the portable personal navigation device while recording the radio program.

21. The method of claim 18, further comprising the steps of storing the recorded radio program in a memory of the portable personal navigation device, and enabling the playback of said recorded radio program at a later time determined by a user of the portable personal navigation device.

* * * * *